No. 878,809. PATENTED FEB. 11, 1908.
W. J. LARNED.
VALVE.
APPLICATION FILED SEPT. 12, 1906.

WITNESSES:
J. J. Laass
E. Laass

INVENTOR
William J. Larned
By E. Laass
ATTORNEY.

UNITED STATES PATENT OFFICE.

WILLIAM J. LARNED, OF SYRACUSE, NEW YORK.

VALVE.

No. 878,809.  Specification of Letters Patent.  Patented Feb. 11, 1908.

Application filed September 12, 1906. Serial No. 334,204.

*To all whom it may concern:*

Be it known that I, WILLIAM J. LARNED, a citizen of the United States, and resident of Syracuse, in the county of Onondaga, in the State of New York, have invented new and useful Improvements in Valves, of which the following, taken in connection with the accompanying drawings, is a full, clear, and exact description.

This invention has special reference to valves which are composed of mica, which material is preferred chiefly on account of its ability of resisting moisture, especially acids and heat. There is however considerable difficulty encountered in the use of valves composed of mica, owing to the liability of the mica face of the valve becoming flaked and thus worn untrue and leaky, especially in cases where the valve encounters either a narrow, or sharp edged, or depressed and concaved seat.

The object of this invention is to obviate such objections to the use of a valve composed of mica. And to that end the invention consists of a valve provided with a flat working face composed of mica, in combination with a correspondingly flat and broad valve-seat as hereinafter more fully described.

Figure 2:
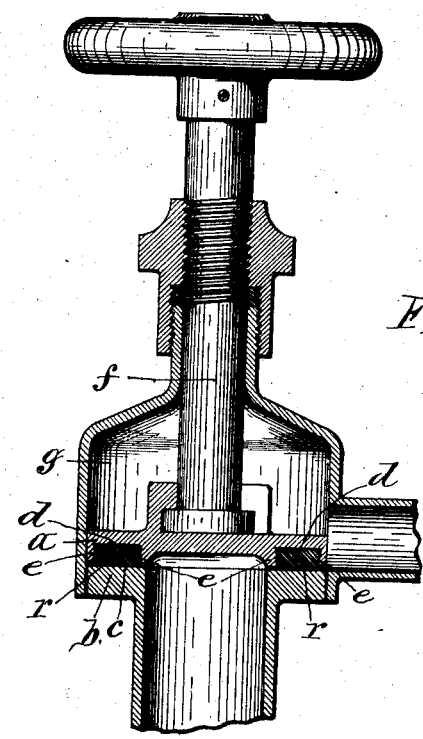
Figure 1:
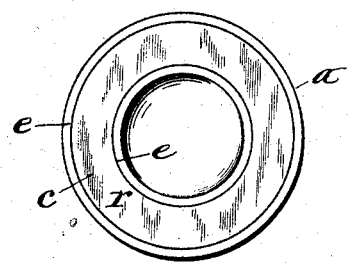

In the accompanying drawings Figure 1 is a face view of a valve embodying my invention; and Fig. 2 is a transverse section of the same.

—$a$— represents the valve and —$b$— its seat. The valve consists of a metal plate which is usually circular shaped. Said valve is provided with a working face $c$ which is composed of mica and firmly secured to the valve. Said working face is perfectly flat as clearly shown in Fig. 1.

I preferably provide the valve with an annular recess —$d$— formed with concentric walls —$e$—$e$— which are undercut on their inner sides to form the recess dovetail in cross-section as shown in Fig. 2 of the drawings. In the recess —$d$— is placed a continuous ring —$r$— composed of mica and thoroughly packed in the recess to cause the undercut walls —$e$—$e$— to pinch or grip the said ring, and thus securely retain it in the recess.

—$f$— denotes the valve-stem which is connected to the valve in the usual manner.

—$g$— represents the valve-cage which may be of any suitable shape and is provided with the valve-seat —$b$— upon which the mica face —$r$— is pressed when the valve is closed. Said valve-seat is broad and perfectly flat and parallel with the working face —$c$— of the valve, and thus obviates cutting, flaking and injury of the mica face —$c$—. Said mica is adapted to conform itself to any slight defects or unevenness of the surface of the valve-seat and thus maintains a tight fit to said seat, and dispenses with the labor of grinding the valve and its seat.

What I claim as my invention is:—

A valve provided with a flat working face composed of mica in combination with a correspondingly flat and broad valve-seat substantially as set forth and shown.

WILLIAM J. LARNED.

Witnesses:
 J. J. LAASS,
 E. LAASS.